US012351073B2

(12) United States Patent
Toyoda et al.

(10) Patent No.: US 12,351,073 B2
(45) Date of Patent: Jul. 8, 2025

(54) VEHICLE TRAVEL CONTROL DEVICE (71) Applicant: MITSUBISHI JIDOSHA KOGYO KABUSHIKI KAISHA, Tokyo (JP)

(72) Inventors: Takeshi Toyoda, Tokyo (JP); Toshifumi Mizui, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 270 days.

(21) Appl. No.: 18/014,020

(22) PCT Filed: Jul. 14, 2021

(86) PCT No.: PCT/JP2021/026529
§ 371 (c)(1),
(2) Date: Dec. 30, 2022

(87) PCT Pub. No.: WO2022/024770
PCT Pub. Date: Feb. 3, 2022

(65) Prior Publication Data
US 2023/0286390 A1 Sep. 14, 2023

(30) Foreign Application Priority Data
Jul. 31, 2020 (JP) ................. 2020-129819

(51) Int. Cl.
*B60L 7/18* (2006.01)
*B60L 15/20* (2006.01)

(52) U.S. Cl.
CPC .......... *B60L 7/18* (2013.01); *B60L 15/2009* (2013.01); *B60L 2240/12* (2013.01);
(Continued)

(58) Field of Classification Search
CPC ............ B60W 30/18127; B60W 20/14; B60T 2270/60; B60L 7/18; B60L 7/10;
(Continued)

(56) References Cited

U.S. PATENT DOCUMENTS 5,406,154 A    4/1995  Kawaguchi et al.
5,552,988 A    9/1996  Kawaguchi et al.
(Continued)

FOREIGN PATENT DOCUMENTS

EP    3 150 423 A1    4/2017
JP    5-64304 A       3/1993
(Continued)

OTHER PUBLICATIONS

International Preliminary Report on Patentability, issued in PCT/JP2021/026529, PCT/IPEA/409, dated Apr. 12, 2022.
(Continued)

*Primary Examiner* — Khoi H Tran
*Assistant Examiner* — Tanner L Cullen
(74) *Attorney, Agent, or Firm* — Birch, Stewart, Kolasch & Birch, LLP (57) ABSTRACT

A vehicle travel control device calculates torques required for a motor in a first regenerative control mode and a second regenerative control mode based on an accelerator opening degree and a vehicle speed, selects torque required for the motor suitable for the first regenerative control mode or the second regenerative control mode from among the calculated torques required for the motor, and limits a change rate of the torque required for the motor when the selected torque required for the motor changes beyond a predetermined change rate by switching from the first regenerative control mode to the second regenerative control mode.

6 Claims, 7 Drawing Sheets

(52) U.S. Cl.
CPC ..... *B60L 2240/423* (2013.01); *B60L 2240/48* (2013.01); *B60L 2250/28* (2013.01); *B60L 2260/26* (2013.01)

(58) Field of Classification Search
CPC ...... B60L 7/12; B60L 7/14; B60L 7/26; B60L 2260/26; B60L 2260/20
See application file for complete search history.

(56) References Cited

U.S. PATENT DOCUMENTS

| | | | |
|---|---|---|---|
| 2013/0162009 A1 | 6/2013 | Mitts et al. | |
| 2015/0222209 A1* | 8/2015 | Crisp | B60W 30/18127 318/376 |
| 2015/0274020 A1* | 10/2015 | Matsuda | B62J 43/16 701/70 |
| 2017/0021729 A1 | 1/2017 | Murase | |
| 2018/0326852 A1 | 11/2018 | Shiozawa et al. | |
| 2021/0162869 A1* | 6/2021 | Nakamura | B60L 15/2045 |
| 2022/0041164 A1* | 2/2022 | Hoshi | B60W 20/40 |

FOREIGN PATENT DOCUMENTS

| | | | | |
|---|---|---|---|---|
| JP | 6-70406 A | 3/1994 | | |
| JP | 2000013904 A | * | 1/2000 | ............... B60L 7/14 |
| JP | 2017-28905 A | 2/2017 | | |
| JP | 2017-205015 A | 11/2017 | | |
| WO | WO 2012/111083 A1 | 8/2012 | | |
| WO | WO 2017/081714 A1 | 5/2017 | | |

OTHER PUBLICATIONS

International Search Report, issued in PCT/JP2021/026529, PCT/ISA/210, dated Oct. 5, 2021.
Written Opinion of the International Searching Authority, issued in PCT/JP2021/026529, PCT/ISA/237, dated Oct. 5, 2021.
Extended European Search Report for European Application No. 21849650.3, dated Mar. 7, 2024.

* cited by examiner

VEHICLE TRAVEL CONTROL DEVICE

TECHNICAL FIELD

The present disclosure relates to a vehicle travel control device.

BACKGROUND ART

Patent Literature 1 discloses a regenerative brake control device that controls regenerative braking force of a vehicle. The regenerative brake control device controls regenerative torque of a motor such that the regenerative braking force of the vehicle increases or decreases in accordance with a shift position set by a paddle switch provided on a steering wheel.

Patent Literature 2 discloses a travel control device for a vehicle that controls an output of a motor based on a signal transmitted from an accelerator pedal. The travel control device for a vehicle controls a regenerative torque of the motor such that a vehicle gradually decelerates by regenerative braking force until the vehicle stops when the accelerator pedal is turned off during traveling of a vehicle.

CITATION LIST

Patent Literature

Patent Literature 1: JP2017-205015A
Patent Literature 2: JPH06-70406A

SUMMARY OF INVENTION

Technical Problem

In a vehicle capable of performing a control disclosed in Patent Literature 1 (hereinafter, referred to as a "first regenerative control") and a control disclosed in Patent Literature 2 (hereinafter, referred to as a "second regenerative control") and capable of switching from a first regenerative control mode in which the first regenerative control is performed to a second regenerative control mode in which the second regenerative control is performed during traveling of the vehicle, the first regenerative control mode is invalidated when a control mode is switched from the first regenerative control mode to the second regenerative control mode.

However, since the regenerative braking force can be increased or decreased in the first regenerative control, the regenerative braking force in the first regenerative control may be larger than the regenerative braking force in the second regenerative control. In this case, when the control mode is switched from the first regenerative control mode to the second regenerative control mode, the regenerative braking force after the switching becomes smaller than that before the switching, and the braking force expected by a driver may not be obtained.

The present invention has been made in view of the above circumstances, and an object thereof is to provide a travel control device capable of obtaining regenerative braking force expected by a driver even when a control mode is switched from a first regenerative control mode in which a first regenerative control is performed to a second regenerative control mode in which a second regenerative control is performed during traveling of a vehicle.

Solution to Problem

A vehicle travel control device according to an embodiment of the present invention is capable of switching from a first regenerative control mode in which regenerative torque of a motor is controlled to increase or decrease regenerative braking force in accordance with a shift position to a second regenerative control mode in which the regenerative torque of the motor is controlled to increase or decrease the regenerative braking force in accordance with an amount of depression of an accelerator pedal during a vehicle traveling. The vehicle travel control device includes: an accelerator required torque calculation unit configured to calculate torques required for the motor (accelerator required torques) in the first regenerative control mode and the second regenerative control mode based on an accelerator opening degree and a vehicle speed; an accelerator required torque selection unit configured to select torque required for the motor (accelerator required torque) suitable for the first regenerative control mode or the second regenerative control mode from among the torques required for the motor (accelerator required torques) calculated by the accelerator required torque calculation unit; and a mode switching change rate limiting unit configured to limit a change rate of the torque required for the motor when the torque required for the motor (accelerator required torque) output from the accelerator required torque selection unit changes beyond a predetermined change rate by switching from the first regenerative control mode to the second regenerative control mode.

According to the above configuration, since the change rate of the torque required for the motor (accelerator required torque) is limited when the torque required for the motor (accelerator required torque) changes beyond the predetermined change rate by switching from the first regenerative control mode to the second regenerative control mode, a change between torque required for the motor (accelerator required torque) before switching from the first regenerative control mode to the second regenerative control mode and torque required for the motor (accelerator required torque) after the switching is suppressed. Accordingly, the regenerative braking force expected by a driver can be obtained even if the control mode is switched from the first regenerative control mode to the second regenerative control mode during the traveling of the vehicle.

In the above configuration, the vehicle travel control device according to the embodiment of the present invention further includes: a driver required torque calculation unit configured to calculate torque required for the motor (driver required torque), and in the first regenerative control mode, the driver required torque calculation unit adds torque required for the motor (paddle regenerative torque) calculated based on the shift position (set by the paddle switch) and the accelerator opening degree to the torque required for the motor limited by the mode switching change rate limiting unit to obtain the torque required for the motor (driver required torque).

According to the above configuration, in the first regenerative control mode, the driver required torque calculation unit adds the torque required for the motor (paddle regenerative torque) calculated based on the shift position and the accelerator opening degree to the torque required for the motor (accelerator required torque) limited by the mode switching change rate limiting unit to obtain the torque required for the motor (driver required torque). Accordingly, in the first regenerative control mode, since the torque required for the motor (driver required torque) is changed by the operation of the paddle switch provided in a vicinity of a steering wheel, the regenerative braking force can be increased or decreased by the driver operating the paddle switch.

In the above configuration of the vehicle travel control device according to the embodiment of the present invention, in the second regenerative control mode, the regenerative torque of the motor is controlled such that the vehicle gradually decelerates by the regenerative braking force until the vehicle stops when the shift position is fixed at a preset shift position and the accelerator opening degree becomes zero.

According to the above configuration, in the second regenerative control mode, the shift position is fixed to the preset shift position, and when the accelerator opening degree becomes 0, the vehicle gradually decelerates by the regenerative braking force until the vehicle stops. Accordingly, deceleration is enabled until the vehicle stops without changing depression of the accelerator pedal to depression of a brake pedal.

In the above configuration of the vehicle travel control device according to the embodiment of the present invention, the mode switching change rate limiting unit limits a change rate of the torque required for the motor before mode switching when the regenerative torque required for the motor at the shift position in the first regenerative control mode is larger than the regenerative torque at the preset shift position in the second regenerative control mode.

According to the above configuration, the mode switching change rate limiting unit limits a change rate of the torque required for the motor before mode switching when the regenerative torque required for the motor is larger at the shift position in the first regenerative control mode than at the preset shift position in the second regenerative control mode. Accordingly, the regenerative torque required for the motor after mode switching becomes greater than the regenerative torque required for the motor before mode switching, and the regenerative braking force can be increased as expected by the driver even if the control mode is switched from the first regenerative control mode to the second regenerative control mode during the traveling of the vehicle.

In the above configuration, the vehicle travel control device according to the embodiment of the present invention includes a mode switching ON determination unit includes a requirement in which a second regenerative control mode switch for switching from the first regenerative control mode to the second regenerative control mode is put into ON state.

According to the above configuration, the mode switching ON determination unit can determine switching from the first regenerative control mode to the second regenerative control mode in accordance with the requirement in which the second regenerative control mode switch is put into ON state.

In the above configuration of the vehicle travel control device according to the embodiment of the present invention, in the second regenerative control mode, the mode switching change rate limiting unit releases a change rate limit when the torque required for the motor (accelerator required torque) calculated by the accelerator required torque calculation unit reaches a target torque.

According to the above configuration, in the second regenerative control mode, the mode switching change rate limiting unit releases a change rate limit when the torque required for the motor (accelerator required torque) calculated by the accelerator required torque calculation unit reaches the target torque. Accordingly, after the torque required for the motor (accelerator required torque) reaches the target torque, the vehicle can decelerate by the target torque (regenerative braking force).

Advantageous Effects of Invention

According to the travel control device for a vehicle in the embodiment of the present invention, the regenerative braking force expected by the driver can be obtained even if the control mode is switched from the first regenerative control mode to the second regenerative control mode during the traveling of the vehicle.

DESCRIPTION OF EMBODIMENTS

An embodiment of the present invention will be described below with reference to the accompanying drawings. However, dimensions, materials, shapes, relative arrangements, and the like of components described as the embodiment or shown in the drawings are not intended to limit the scope of the present invention thereto, and are merely illustrative examples.

A vehicle on which a travel control device 1 according to the embodiment of the present invention is mounted is an electric vehicle such as an electric vehicle (EV), a hybrid vehicle (HV), a plug-in hybrid vehicle (PHV), or a plug-in hybrid electric vehicle (PHEV), and regenerates deceleration energy of the vehicle into electric energy.

The travel control device 1 according to the embodiment of the present invention can switch from a first regenerative control mode to a second regenerative control mode during traveling of the vehicle.

Figure 1A:
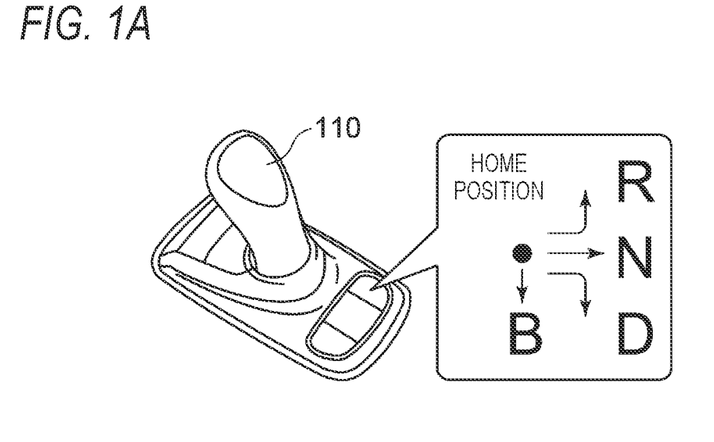
FIG. 1A is a diagram schematically showing a shift lever.
Figure 1B:
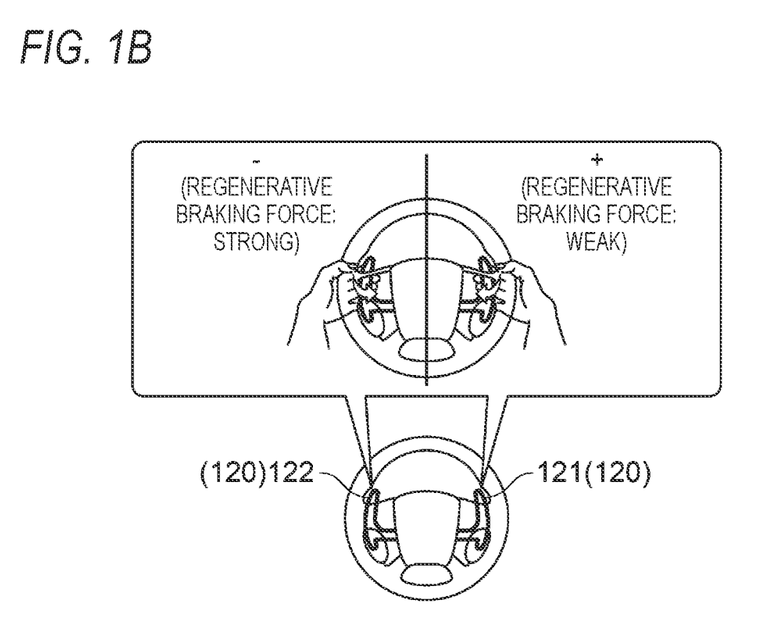
FIG. 1B is a diagram schematically showing a paddle switch.
Figure 1C:
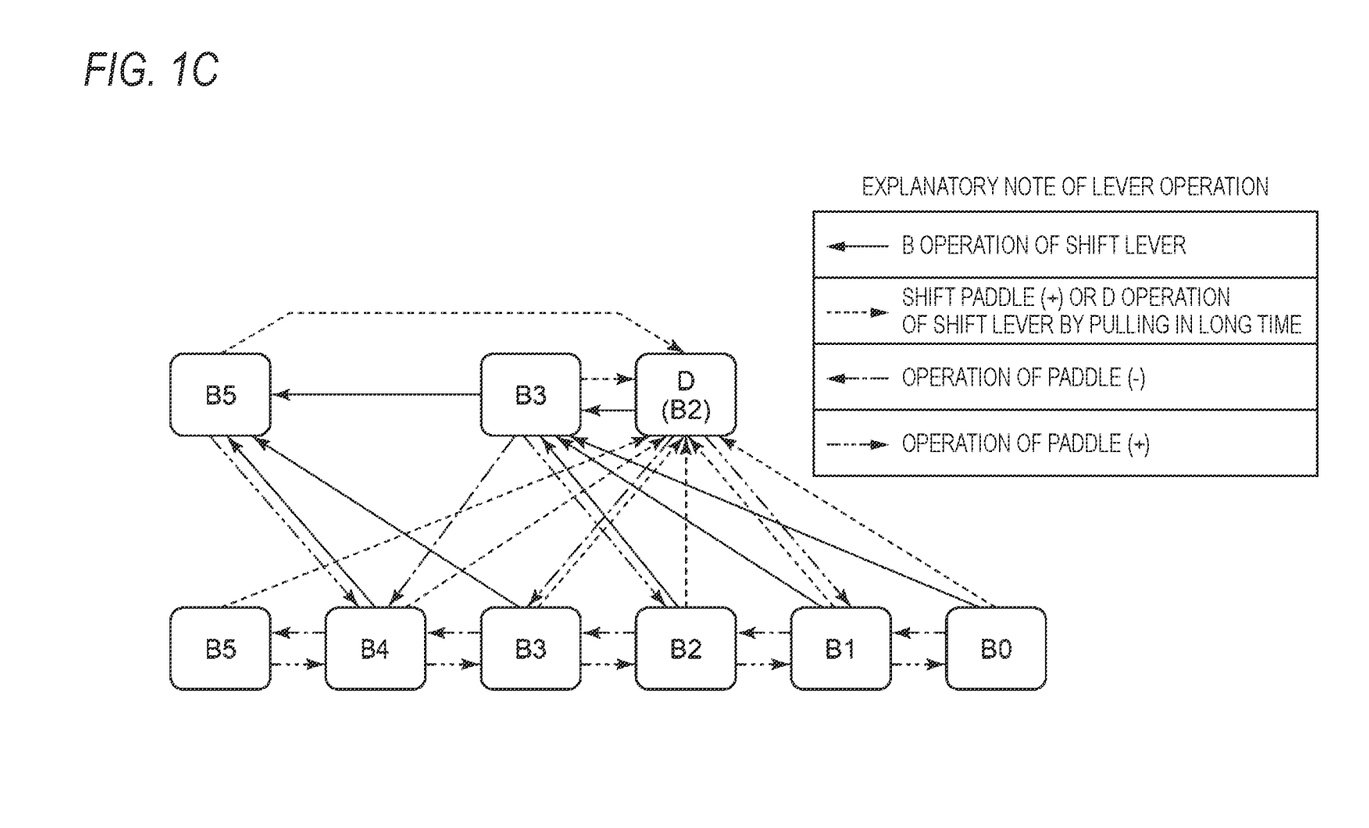
FIG. 1C is a diagram illustrating a first regenerative control implemented by a travel control device according to an embodiment of the present invention.

In the first regenerative control mode, regenerative torque of a motor is controlled such that torque required for the motor (not shown) (hereinafter, referred to as "accelerator required torque") increases according to an amount of depression of an accelerator pedal, and regenerative braking force increases or decreases according to a shift position set by a shift lever 110 or a paddle switch 120. As shown in FIGS. 1A to 1C, the shift positions that can be set by the shift lever 110 or the paddle switch 120 are, for example, six positions from B0 (small regenerative force) to B5 (large regenerative force), and when the accelerator pedal (not shown) is turned off, the regenerative torque of the motor is controlled such that a regenerative brake acts according to the shift position.

The shift lever 110 can be operated from a home position to each position of R (reverse), N (neutral), D (drive), and B (regenerative brake), and the basic shift position "D (B2)" is selected by operating the shift lever 110 to D. Further, in this state, by operating the shift lever 110 once to B, the shift position "B3" where regenerative force is larger by one step is selected, and by operating the shift lever 110 once again to B, the shift position "B5" where the regenerative force is maximized is selected. The paddle switch 120 includes a paddle plus switch 121 and a paddle minus switch 122. The paddle plus switch 121 is for displacing the shift position to a shift position where the regenerative force is smaller by one step, and each time the paddle plus switch 121 is operated, the shift position is displaced to a shift position where the regenerative force is smaller by one step. The paddle minus switch 122 is for displacing the shift position to a shift position where the regenerative force is larger by one step, and each time the paddle minus switch 122 is operated, the shift position is displaced to a shift position where the regenerative force is larger by one step.

In the second regenerative control mode, the first regenerative control mode is invalidated, the accelerator required torque increases depending on the amount of depression of the accelerator pedal, and the regenerative torque of the motor is controlled such that the shift position is fixed at a preset shift position, and the vehicle gradually decelerates by the regenerative braking force until the vehicle stops. The preset shift position is, for example, the basic shift position "D (B2)", and when the accelerator pedal is turned off, the regenerative torque of the motor is controlled such that the vehicle gradually decelerates by the regenerative braking force until the vehicle stops.

Figure 2:
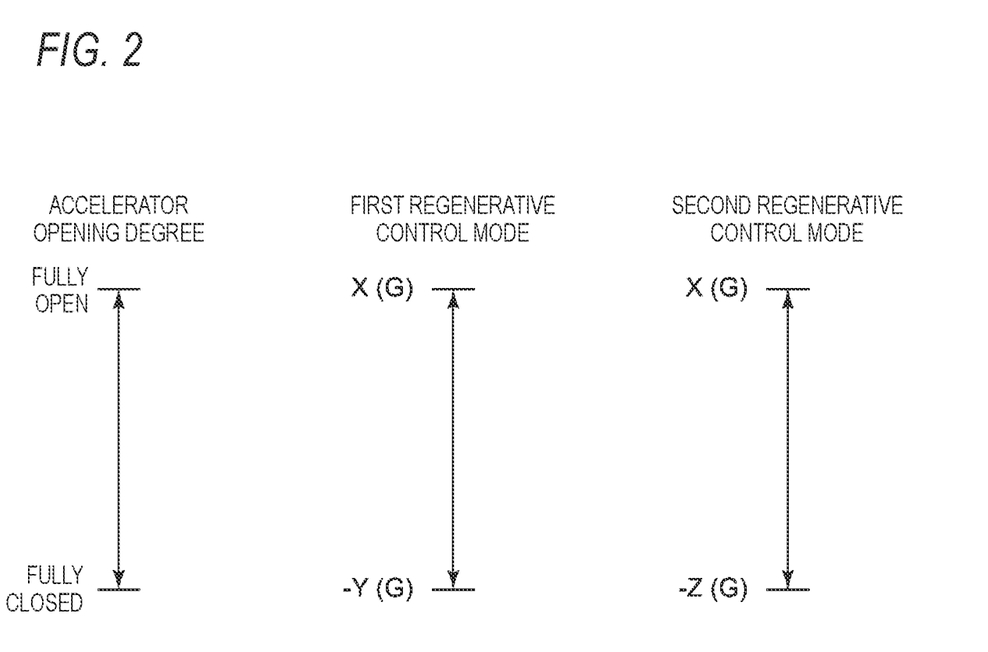
FIG. 2 is a diagram showing a relationship between an accelerator opening degree and an acceleration in the first regenerative control and a second regenerative control implemented by the travel control device according to the embodiment of the present invention.

As shown in FIG. 2, for example, torque of X (G) to -Y (G) is required by the accelerator pedal in the first regenerative control mode, whereas torque of X (G) to -Z (G) is required by the accelerator pedal in the second regenerative control mode. (G) is a unit of gravitational acceleration, and X, Y, and Z are positive numbers. In addition, X is any number, and Y<<Z. Accordingly, the regenerative torque required for the motor in the second regenerative control mode can be controlled in a wider range than that in the first regenerative control mode, and the regenerative braking force can be controlled in a wider range (the regenerative braking force larger in the second regenerative control mode than that in the first regenerative control mode can be obtained).

Further, since the amount of depression by which the accelerator pedal can be depressed does not change, even if the amount of depression of the accelerator pedal is the same, larger torque is required in the second regenerative control mode than that in the first regenerative control mode. Therefore, as shown in FIG. 2, when the control mode is switched from the first regenerative control mode to the second regenerative control mode (when the second regenerative control mode is selected), a range of torque change with respect to an accelerator operation (unit amount) becomes large, and ease of operation by the driver is reduced (the acceleration and deceleration are greatly performed by a small accelerator operation). In such a state, since further amplification of the regenerative torque in the first regenerative control mode cannot be permitted, when the control mode is switched from the first regenerative control mode to the second regenerative control mode, the first regenerative control mode is invalidated.

Figure 3:
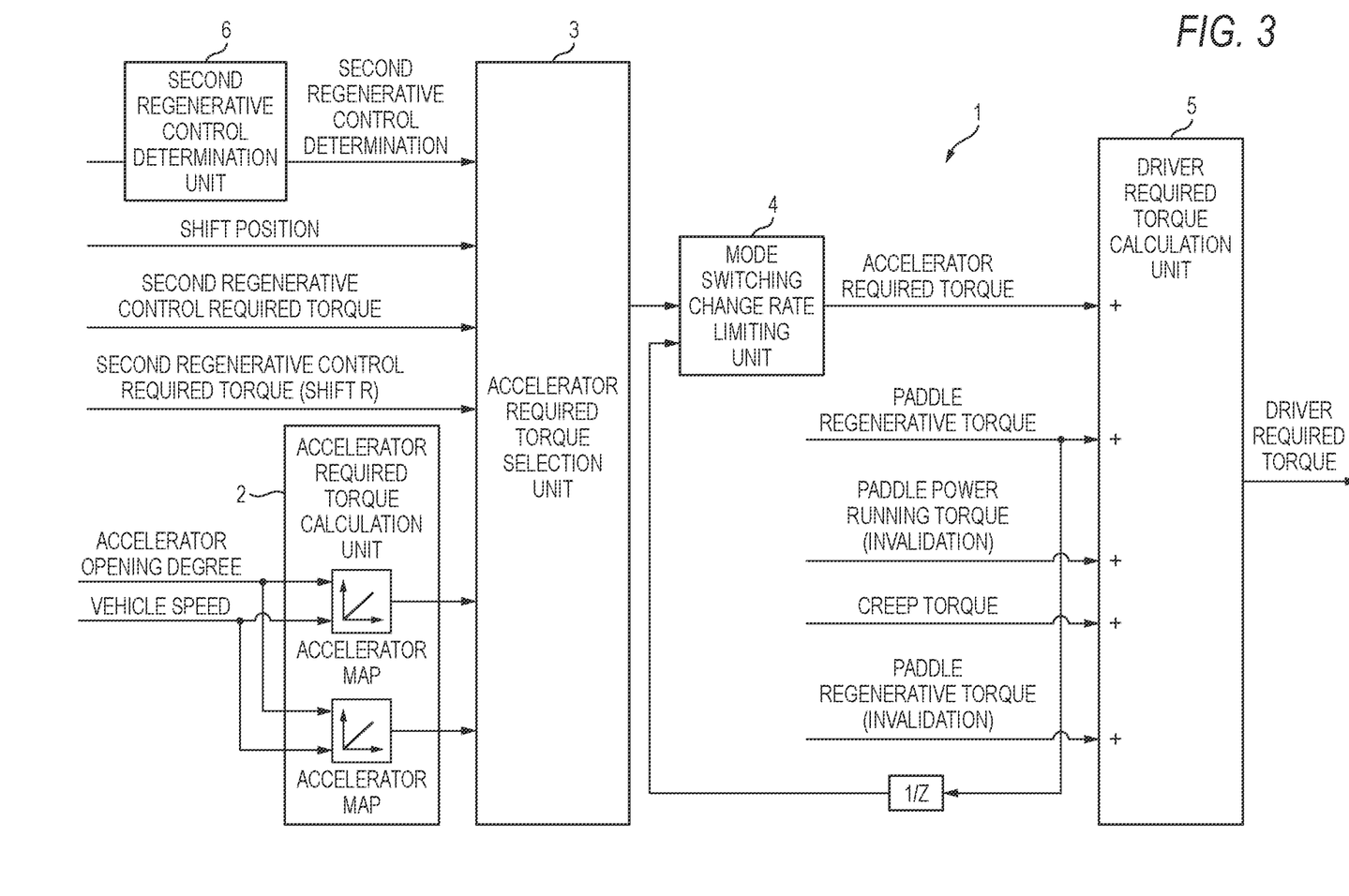
FIG. 3 is a block diagram schematically showing the travel control device for a vehicle according to the embodiment of the present invention.

As shown in FIG. 3, the travel control device 1 for a vehicle according to the embodiment of the present invention includes an accelerator required torque calculation unit 2, an accelerator required torque selection unit 3, and a mode switching change rate limiting unit 4.

The accelerator required torque calculation unit 2 calculates the torque required for the motor (accelerator required torque) based on an accelerator opening degree and a vehicle speed for each regenerative control mode. For example, in the accelerator required torque calculation unit 2, a data table (accelerator map) in which the accelerator required torque is associated with the accelerator opening degree and the vehicle speed is provided for each regenerative control mode, and the accelerator required torque is obtained for each regenerative control mode by specifying the accelerator opening degree and the vehicle speed. The regenerative control mode is switched from the first regenerative control mode to the second regenerative control mode by a second regenerative control mode switch (not shown) provided in a console (not shown).

The accelerator required torque calculation unit 2 is provided with the data tables (the accelerator maps) for the first regenerative control mode and the second regenerative control mode, and the accelerator required torque is obtained for each regenerative control mode based on the accelerator opening degree and the vehicle speed. Then, the calculated accelerator required torque of each regenerative control mode is output to the accelerator required torque selection unit 3.

The accelerator required torque selection unit 3 selects accelerator required torque suitable for each regenerative control mode from the accelerator required torques of respective regenerative control modes calculated by the accelerator required torque calculation unit 2. In the embodiment of the present invention, in addition to the accelerator required torques of the respective regenerative control modes calculated by the accelerator required torque calculation unit 2, the second regenerative control determination, the shift position, the second regenerative required torque, and the second regenerative required torque (shift R) are input to the accelerator required torque selection unit 3, and the accelerator required torque suitable for the regenerative control mode is selected.

The second regenerative control determination is whether the second regenerative control is established, and "0" is set when the second regenerative control determination is not established, and "1" is set when the second regenerative control determination is established. As described above, the shift position is a shift position that can be set by the shift lever 110, and any one of D (B2), B3, and B5 is selected by the shift lever 110 in the first regenerative control mode, and the shift position is fixed to D (B2) in the second regenerative control mode.

Therefore, in the first regenerative control mode, the accelerator required torque in the first regenerative control mode calculated by the accelerator required torque calculation unit 2 becomes the accelerator required torque, and in the second regenerative control mode, the accelerator required torque in the second regenerative control mode calculated by the accelerator required torque calculation unit 2 becomes the accelerator required torque.

The mode switching change rate limiting unit 4 limits a change rate of the accelerator required torque when the accelerator required torque output from the accelerator required torque selection unit 3 changes beyond a predetermined change rate by switching the control mode from the first regenerative control mode to the second regenerative control mode. Accordingly, the mode switching change rate limiting unit 4 can prevent driving force fluctuation exceeding the predetermined change rate due to the switching from the first regenerative control mode to the second regenerative control mode. Therefore, even if the control mode is switched from the first regenerative control mode to the second regenerative control mode when the regenerative braking force in the first regenerative control mode is larger than the braking force in the second regenerative control mode, the regenerative braking force after the switching can be prevented from becoming significantly smaller than that before the switching, and the regenerative braking force expected by the driver can be obtained.

Figure 4:
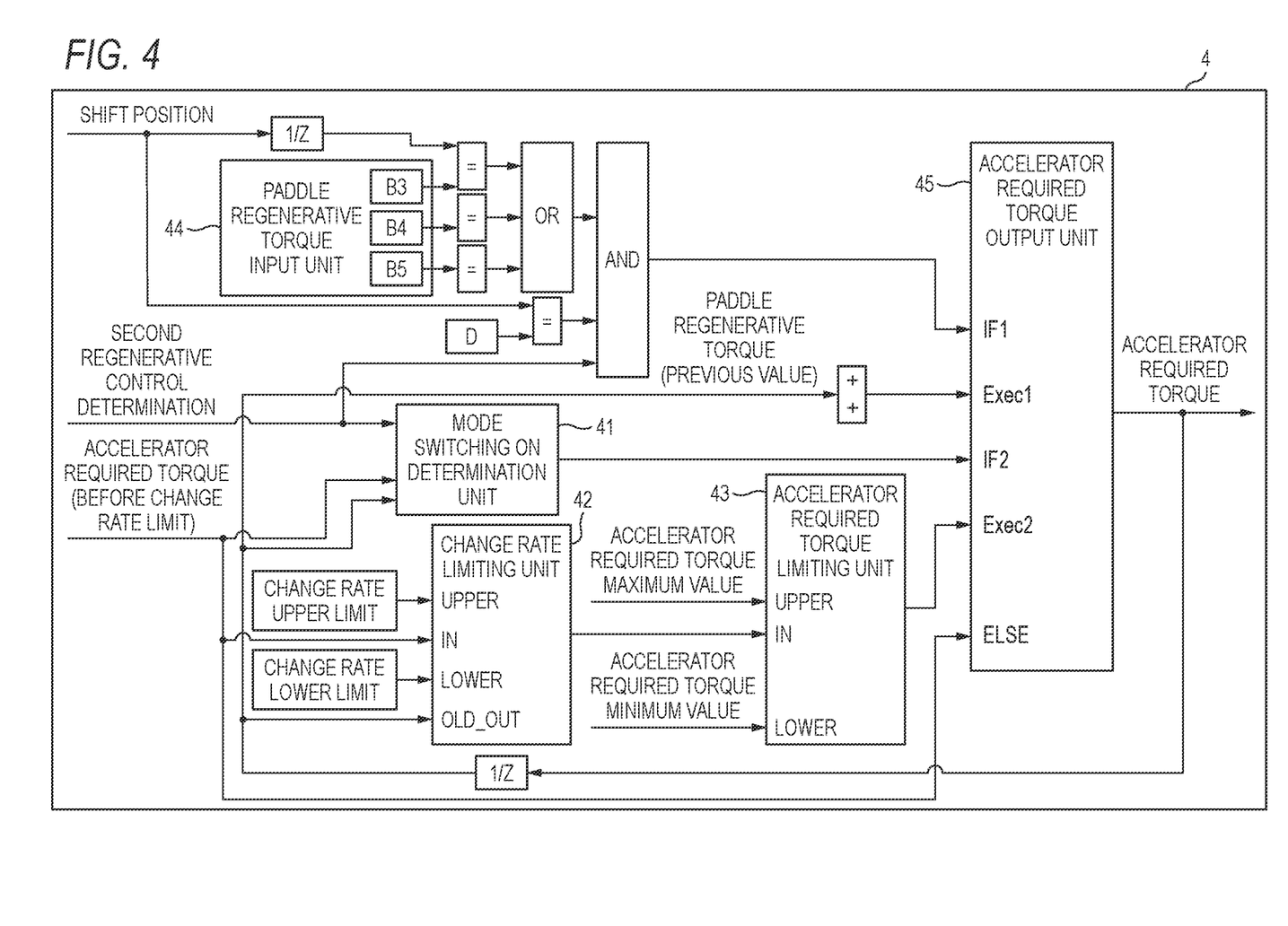
FIG. 4 is a block diagram showing details of a mode switching change rate limiting unit shown in FIG. 3.

As shown in FIG. 4, the mode switching change rate limiting unit 4 includes a mode switching ON determination unit 41, a change rate limiting unit 42, an accelerator required torque limiting unit 43, a paddle regenerative torque input unit 44, and an accelerator required torque output unit 45.

The mode switching ON determination unit 41 determines whether the switching from the first regenerative control mode to the second regenerative control mode is established, and when the switching from the first regenerative control mode to the second regenerative control mode is established, the mode switching ON determination is switched from "0" to "1". For example, the second regenerative control determination and the accelerator required torque are input to the mode switching ON determination unit 41, and the mode switching ON determination unit 41 determines whether the switching from the first regenerative control mode to the second regenerative control mode is established.

The change rate limiting unit 42 compares accelerator required torque (IN) before change rate limit with accelerator required torque (OLD_OUT) after the change rate limit immediately before, and limits the change rate of the accelerator required torque to a predetermined range. For example, a change rate upper limit (UPPER) and a change rate lower limit (LOWER) are set in the change rate limiting unit 42, and the change rate limiting unit 42 limits the change rate of the accelerator required torque between the change rate upper limit and the change rate lower limit.

The accelerator required torque limiting unit 43 limits the accelerator required torque to the change rate limited by the change rate limiting unit 42. In addition to the change rate (IN) limited by the change rate limiting unit 42, a maximum value (UPPER) and a minimum value (LOWER) of the accelerator required torque are input to the accelerator required torque limiting unit 43, and the accelerator required torque of the change rate limited by the change rate limiting unit 42 is output from the accelerator required torque limiting unit 43.

The paddle regenerative torque input unit 44 receives the regenerative torque before the mode switching (the regenerative torque in the first regenerative control mode) at the time of switching the control mode from the first regenerative control mode to the second regenerative control mode. In the embodiment of the present invention, the regenerative torque before the mode switching is input when the regenerative force at the shift position in the first regenerative control mode is larger than the regenerative force at the shift position in the second regenerative control mode. Therefore, in the embodiment of the present invention, the regenerative torque (the regenerative torque in the first regenerative control mode) is input when the shift position in the first regenerative control mode is B3, B4 or B5 where the regenerative force is larger than the regenerative force in D (B2).

The accelerator required torque output unit 45 adds the regenerative torque before mode switching (the regenerative torque in the first regenerative control mode) to the accelerator required torque after mode switching (the accelerator required torque in the second regenerative control mode), and outputs the added torque. In the embodiment of the present invention, the regenerative torque before mode switching is added to the accelerator required torque (correction value) after mode switching in which the change rate at the time of the mode switching is limited, and the added torque is output.

As shown in FIG. 3, the travel control device 1 for a vehicle according to the embodiment of the present invention further includes a driver required torque calculation unit 5.

The driver required torque calculation unit 5 adds paddle regenerative torque calculated based on the shift position set by the paddle switch 120 and the accelerator opening degree to the accelerator required torque limited by the mode switching change rate limiting unit 4 to obtain driver required torque. In the embodiment of the present invention, the driver required torque calculation unit 5 adds paddle power running torque (invalidation), creep torque, and the regenerative torque (invalidation) in the second regenerative control mode in addition to the paddle regenerative torque to the accelerator required torque limited by the mode switching change rate limiting unit 4 to obtain the driver required torque.

Further, in the embodiment of the present invention, when the control mode is switched from the first regenerative control mode to the second regenerative control mode, the regenerative torque before mode switching (the regenerative torque in the first regenerative control mode) is input to the mode switching change rate limiting unit 4, and the regenerative torque before mode switching (the regenerative torque in the first regenerative control mode) is added to the accelerator required torque after mode switching (the accelerator required torque in the second regenerative control mode).

In the embodiment of the present invention, as shown in FIG. 3, a second regenerative control determination unit 6 is provided. The second regenerative control determination unit 6 includes a requirement in which a second regenerative control regenerative mode switch for switching from the first regenerative control mode to the second regenerative control mode is put into ON state.

Figure 5:
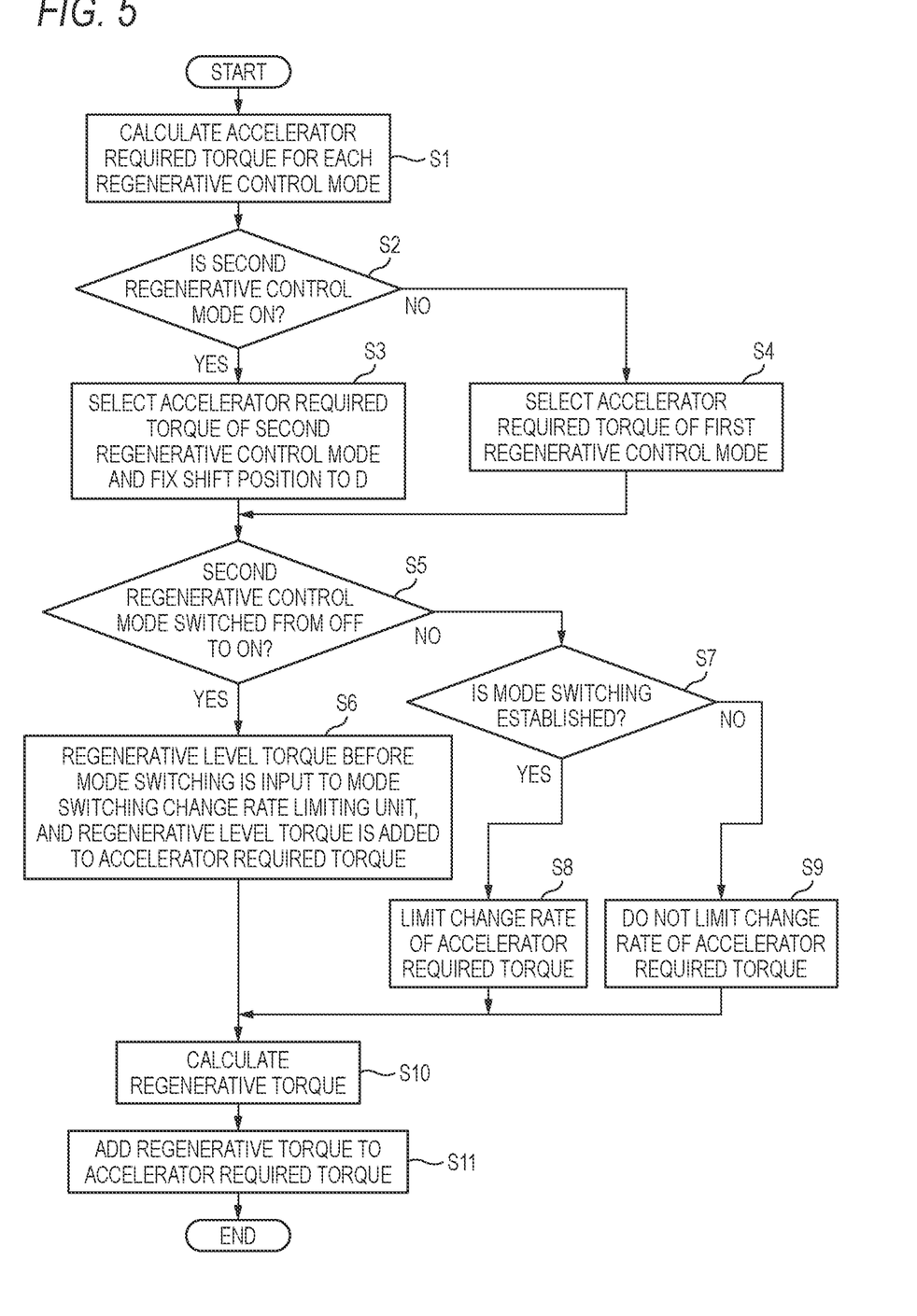
FIG. 5 is a flowchart schematically showing a control procedure of the travel control device for a vehicle according to the embodiment of the present invention.

As shown in FIG. 5, in the travel control device 1 for a vehicle according to the embodiment of the present invention, first, the accelerator required torque calculation unit 2 calculates the accelerator required torque for each regenerative control mode based on the accelerator opening degree and the vehicle speed (step S1). For example, in the accelerator required torque calculation unit 2, the data table (accelerator map) in which the accelerator required torque is associated with the accelerator opening degree and the vehicle speed is provided for each regenerative control mode, and the accelerator required torque is obtained for each regenerative control mode by specifying the accelerator opening degree and the vehicle speed.

Next, the second regenerative control determination unit 6 determines whether the second regenerative control mode is ON (step S2). Whether the second regenerative control mode is ON is determined by, for example, whether the second regenerative control mode switch provided in the console (not shown) is ON.

When the second regenerative control mode is ON (step S2: Yes), the accelerator required torque selection unit 3 selects the accelerator required torque of the second regenerative control mode from the accelerator required torques of the respective regenerative control modes, and fixes the shift position to D (B2) (step S3).

On the other hand, when the second regenerative control mode is not ON, that is, when the second regenerative control mode is the first regenerative control mode (step S2: No), the accelerator required torque selection unit 3 selects the accelerator required torque of the first regenerative control mode from the accelerator required torques of the regenerative control modes (step S4).

Next, the second regenerative control determination unit 6 determines whether the second regenerative control mode is switched from OFF to ON, that is, whether the control mode is switched from the first regenerative control mode to the second regenerative control mode (step S5). When it is determined that the second regenerative control mode is switched from OFF to ON (step S5: Yes), the regenerative torque before mode switching (the regenerative torque in the first control mode) is input to the mode switching change rate limiting unit 4, and the regenerative torque before mode switching is added to the accelerator required torque after mode switching (the accelerator required torque (regenerative torque) in the second regenerative control mode) (step S6).

On the other hand, when it is determined that the second regenerative control mode is not switched from OFF to ON, that is, the first regenerative control mode is maintained (step S5: No), the mode switching ON determination unit 41 of the mode switching change rate limiting unit 4 determines whether the mode switching is established (step S7). At this time, when it is determined that the switching of the driver mode is established, the mode switching ON determination is switched from "0" to "1" (step S7: Yes). When the mode switching ON determination unit 41 of the mode switching change rate limiting unit 4 determines that the mode switching is established (step S7: Yes), the change rate limiting unit 42 of the mode switching change rate limiting unit 4 compares the accelerator required torque before the change rate limit with the accelerator required torque after the change rate limit to limit the change rate of the accelerator required torque (step S8).

On the other hand, when the mode switching ON determination unit 41 of the mode switching change rate limiting unit 4 determines that the mode switching is not established, the mode switching determination remains unchanged in "0" (step S7: No). When the mode switching ON determination unit 41 of the mode switching change rate limiting unit 4 determines that the mode switching is not established (step S7: No), the change rate limiting unit 42 of the mode switching change rate limiting unit 4 does not limit the change rate of the accelerator required torque (step S9).

Following the processing of any one of steps S6, S8, and S9, the mode switching change rate limiting unit 4 calculates the regenerative torque based on the accelerator opening degree and the shift position (step S10). Finally, the driver required torque calculation unit 5 adds the regenerative torque to the accelerator required torque to obtain the driver required torque (step S11). In the case of the second regenerative control mode, the shift position is D, and 0 is added as the regenerative torque to the accelerator required torque to obtain the driver required torque.

Figure 6:
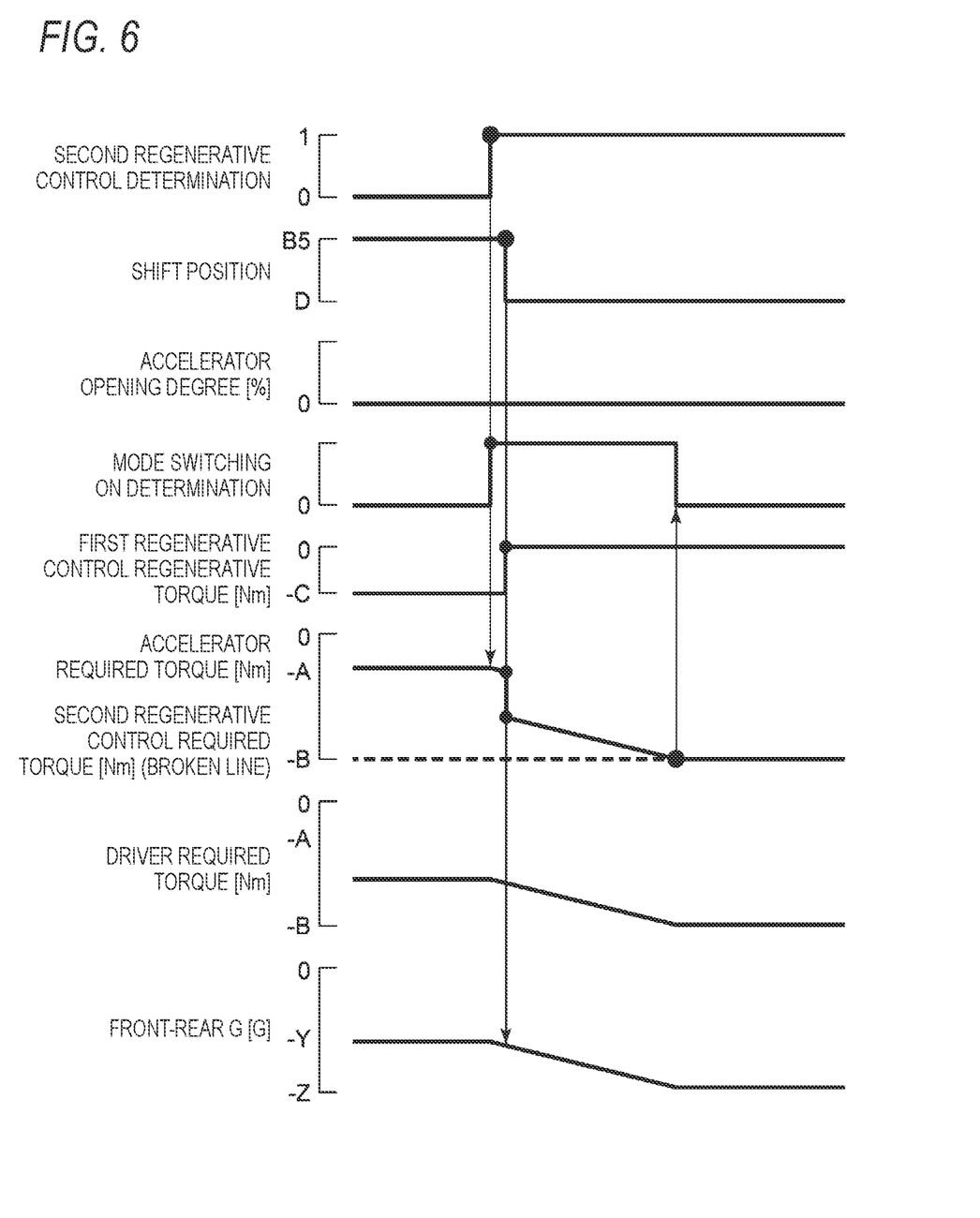
FIG. 6 is a timing chart schematically showing control timing of the travel control device for a vehicle according to the embodiment of the present invention.

As shown in FIG. 6, in the travel control device 1 for a vehicle according to the embodiment of the present invention described above, in the case of the first regenerative control mode, the shift position is any one of "B0" to "B5", and the accelerator required torque calculation unit 2 calculates the accelerator required torque based on the accelerator opening degree and the vehicle speed. For example, in the example shown in FIG. 6, when the shift position is "B5" and the accelerator opening degree is 0% (the accelerator is fully closed), the accelerator required torque is −A (Nm), the regenerative torque is −C (Nm), the driver required torque is −A−C (Nm), and a front-rear G is −Y (G).

When the second regenerative control mode switch (not shown) provided in the console (not shown) is turned on, the second regenerative control determination is established, and the mode switching ON determination is established, the second regenerative control determination changes from "0" to "1", and the mode switching ON determination changes from "0" to "1". Accordingly, the accelerator required torque is gradually switched from the accelerator required torque in the first regenerative control mode to the accelerator required torque in the second regenerative control mode. As a result, the accelerator required torque, the driver required torque, and the front-rear G gradually decrease.

When the second regenerative control determination is established and the second regenerative control determination changes from "0" to "1", the shift position changes from any one of "B0" to "B5" to "D". For example, in the example shown in FIG. 6, the shift position is switched from "B5" to "D". Accordingly, although the regenerative torque (the regenerative torque in the first regenerative control mode) becomes 0, since the regenerative torque before mode switching is input to the mode switching change rate limiting unit 4, and the regenerative torque before mode switching is added to the accelerator required torque after mode switching (the accelerator required torque in the second regenerative control mode (accelerator required regenerative torque)), the accelerator required torque decreases (the accelerator required regenerative torque increases), and the driver required torque gradually decreases without increasing (the driver required regenerative torque gradually increases).

When the accelerator required torque reaches a target value (the accelerator required torque in the second regenerative control mode), the mode switching ON determination is not established, and the mode switching ON determination changes from "1" to "0". Accordingly, the change rate limit in the mode switching change rate limiting unit 4 is released. In the example shown in FIG. 6, the change rate limit is released when the accelerator required torque becomes −B (Nm), the driver required torque becomes −B (Nm), and the front-rear G becomes −Z (G).

According to the travel control device 1 for a vehicle according to the embodiment of the present invention described above, in the first regenerative control mode, the regenerative braking force increases or decreases in accordance with the shift position set by the shift lever 110 or the paddle switch 120, and in the second regenerative control mode, the vehicle gradually decelerates by the regenerative braking force until the vehicle stops. Accordingly, deceleration according to a driver's preference is enabled.

Further, although the regenerative torque (the regenerative torque in the first regenerative control mode) becomes 0 when the control mode is switched from the first regenerative control mode to the second regenerative control mode during traveling of the vehicle, since the regenerative torque before mode switching (the regenerative torque in the first regenerative control mode) is input to the mode switching change rate limiting unit 4, and the regenerative torque before mode switching (regenerative torque in the first regenerative control mode) is added to the accelerator required torque after mode switching, a change between the driver required torque (a change in the regenerative torque) before mode switching and the driver required torque after mode switching is suppressed. Accordingly, the regenerative braking force expected by the driver can be obtained even if the control mode is switched from the first regenerative control mode to the second regenerative control mode during the traveling of the vehicle.

Further, when the regenerative torque of the motor is larger at the shift position in the first regenerative control mode than at the shift position in the second regenerative control mode, since the regenerative torque before mode switching (the regenerative torque in the first regenerative control mode) is added to the accelerator required torque after mode switching, the driver required torque becomes smaller (the regenerative torque becomes larger) after mode switching than before mode switching. Accordingly, the regenerative braking force can be increased as expected by the driver even if the control mode is switched from the first regenerative control mode to the second regenerative control mode during the traveling of the vehicle.

Further, since the second regenerative control determination unit 6 that includes the requirement in which the second regenerative control mode switch for switching from the first regenerative control to the second regenerative control is put into ON state is provided, it is possible to determine whether the second regenerative control is established in accordance with the requirement in which the second regenerative control mode switch is put into ON state.

The regenerative torque in the first regenerative control mode can be calculated based on the shift position and the accelerator opening degree that is 0, the regenerative torque in the first regenerative control mode can be calculated based on the shift position.

In the second regenerative control mode, since the change rate limit is released when the accelerator required torque reaches the target torque, the vehicle can decelerate by the target torque (regenerative braking force) thereafter.

The present invention is not limited to the above-described embodiment, and includes an embodiment in which modifications are applied to the above-described embodiment and an embodiment in which these embodiments are appropriately combined.

Although various embodiments have been described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. In addition, components in the above embodiment may be combined freely within a range not departing from the spirit of the present invention.

This application is based on Japanese Patent Application No. 2020-129819, filed on Jul. 31, 2020, the contents of which are incorporated herein by reference.

REFERENCE SIGNS LIST

1 travel control device
2 accelerator required torque calculation unit
3 accelerator required torque selection unit
4 mode switching change rate limiting unit
41 mode switching ON determination unit
42 change rate limiting unit
43 accelerator required torque limiting unit
44 paddle regenerative torque input unit
45 accelerator required torque output unit
5 driver required torque calculation unit
6 second regenerative control determination unit
110 shift lever
120 paddle switch
121 paddle plus switch
122 paddle minus switch

The invention claimed is:

1. A vehicle travel control device capable of switching between a first regenerative control mode and a second regenerative control mode during traveling of a vehicle, the vehicle travel control device comprising:
a second regenerative control mode switch that switches, by an ON operation,
from the first regenerative control mode in which regenerative torque of a motor is controlled to increase or decrease regenerative braking force in accordance with a shift position,
to the second regenerative control mode in which a shift position is fixed at a preset shift position and the regenerative torque of the motor is controlled to increase or decrease the regenerative braking force in accordance with an amount of depression of an accelerator pedal; and
a controller configured to:
calculate torques required for the motor in the first regenerative control mode and the second regenerative control mode based on an accelerator opening degree and a vehicle speed;
select torque required for the motor suitable for the first regenerative control mode or the second regenerative control mode from among the torques required for the motor calculated in the step of calculating torques required for the motor; and
limit a change rate of the torque required for the motor when the torque required for the motor output by the step of selecting torque required for the motor changes beyond a predetermined change rate by switching, by the ON operation of the second regenerative control mode switch, from the first regenerative control mode to the second regenerative control mode.

2. The vehicle travel control device for according claim 1, wherein the controller is further configured to:
calculate torque required for the motor, wherein
in the first regenerative control mode, the step of calculating torque required for the motor adds torque required for the motor calculated based on the shift position and the accelerator opening degree to the torque required for the motor limited by the step of limiting a change rate of the torque to obtain the torque required for the motor.

3. The vehicle travel control device for according to claim 1, wherein the controller is configured to:
in the second regenerative control mode, control the regenerative torque of the motor such that the vehicle gradually decelerates by the regenerative braking force until the vehicle stops when the shift position is fixed at a preset shift position and the accelerator opening degree becomes zero.

4. The vehicle travel control device according to claim 3, wherein in the step of limiting the change rate of the torque, the controller is configured to:
limit a change rate of the torque required for the motor before mode switching when the regenerative torque required for the motor at the shift position in the first regenerative control mode is larger than the regenerative torque at the preset shift position in the second regenerative control mode.

5. The vehicle travel control device according to claim 1, wherein the controller is further configured to:
   determine whether the second regenerative control mode switch for switching from the first regenerative control mode to the second regenerative control mode is put into ON state.

6. The vehicle travel control device according to claim 1, wherein
   in the second regenerative control mode, the step of limiting the change rate of the torque releases a change rate limit when the torque required for the motor calculated in the step of calculating torques required for the motor reaches a target torque.

* * * * *